United States Patent [19]

Bolle'

[11] Patent Number: 5,412,438
[45] Date of Patent: May 2, 1995

[54] SUNGLASSES WITH DETACHABLE PRESCRIPTION EYEGLASSES

[75] Inventor: Maurice Bolle', Oyonnax, France

[73] Assignee: Etablissements Bolle' S.N.C., Oyonnax, France

[21] Appl. No.: 144,144

[22] Filed: Oct. 27, 1993

Related U.S. Application Data

[63] Continuation of Ser. No. 761,388, Sep. 18, 1991, abandoned.

[51] Int. Cl.$^6$ .................................................. G02C 7/10
[52] U.S. Cl. ........................................ 351/44; 351/57; 351/138
[58] Field of Search .................. 351/132, 138, 47, 57, 351/44, 80, 88, 131, 44; 2/446, 441, 434, 426

[56] References Cited

U.S. PATENT DOCUMENTS

| D. 339,364 | 9/1993 | Bollé . |
| 2,444,498 | 7/1948 | Cochran . |
| 2,682,196 | 6/1954 | Baldanza . |
| 2,774,279 | 12/1956 | Olson et al. . |
| 3,189,913 | 6/1965 | Hoffmaster . |
| 3,209,366 | 9/1965 | Lindblom . |
| 3,233,250 | 2/1966 | Jonassen . |
| 3,391,976 | 7/1968 | Lindblom . |
| 3,526,449 | 9/1970 | Bollé . |
| 4,163,607 | 8/1979 | Nannini . |
| 4,405,214 | 9/1983 | Bollé . |
| 4,464,025 | 8/1984 | Lhospice . |
| 4,670,915 | 6/1987 | Evans . |
| 4,704,015 | 11/1987 | Grendol et al. . |
| 4,730,915 | 3/1988 | Jannard . |
| 4,859,048 | 8/1989 | Jannard . |
| 4,867,550 | 9/1989 | Jannard . |
| 4,951,322 | 8/1990 | Lin . |
| 5,007,727 | 4/1991 | Kahaney et al. . |
| 5,032,017 | 7/1991 | Bollé . |
| 5,056,906 | 10/1991 | Akiyoshi . |
| 5,170,502 | 12/1992 | Hegendorfer et al. .............. 2/446 |

FOREIGN PATENT DOCUMENTS

| 0194065 | 9/1986 | European Pat. Off. . |
| 2472764 | 7/1981 | France . |
| 2620023 | 3/1989 | France . |
| 2643728 | 8/1990 | France . |
| 9012115 | 10/1990 | Germany . |
| 4118018 | 5/1992 | Germany . |

*Primary Examiner*—William L. Sikes
*Assistant Examiner*—Hung Xuan Dang
*Attorney, Agent, or Firm*—Gregg I. Anderson; Holland & Hart

[57] ABSTRACT

An interchangeable nose-piece for releasable connection to a pair of sport sunglasses is shown. The sport sunglasses include a curved plastic shield and a releasably connected standard nose-piece. The interchangeable nose-piece includes means for supporting a pair of prescription eyeglass lenses and connection means which substantially conform to the standard nose-piece for interchangeable use and releasable connection to the sport sunglass shield.

6 Claims, 2 Drawing Sheets

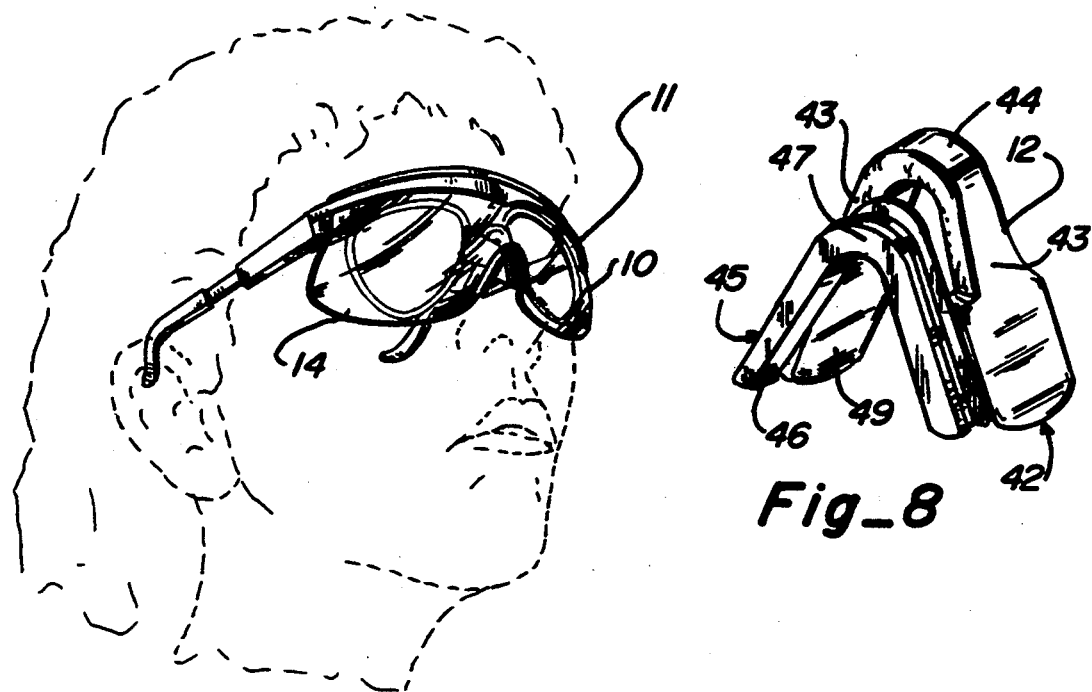
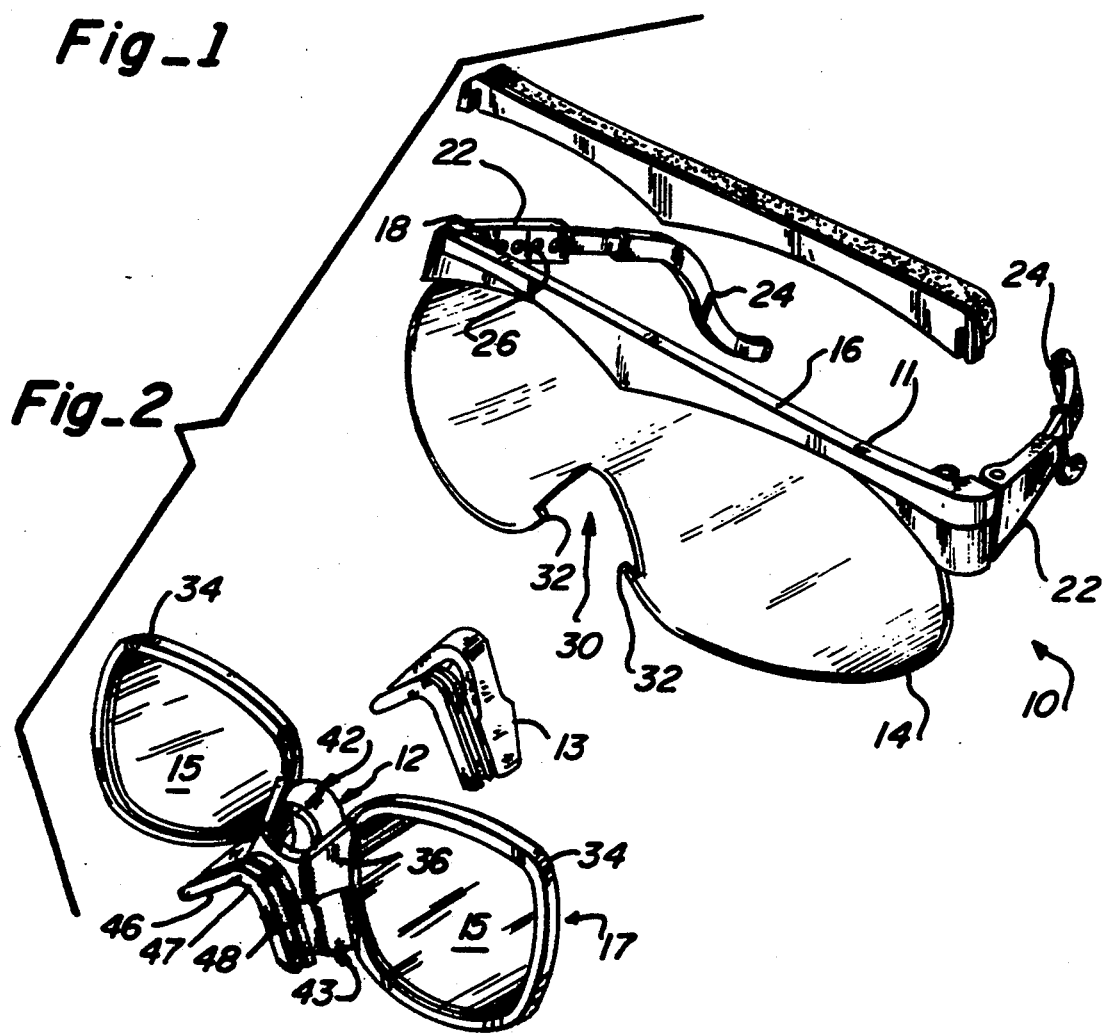

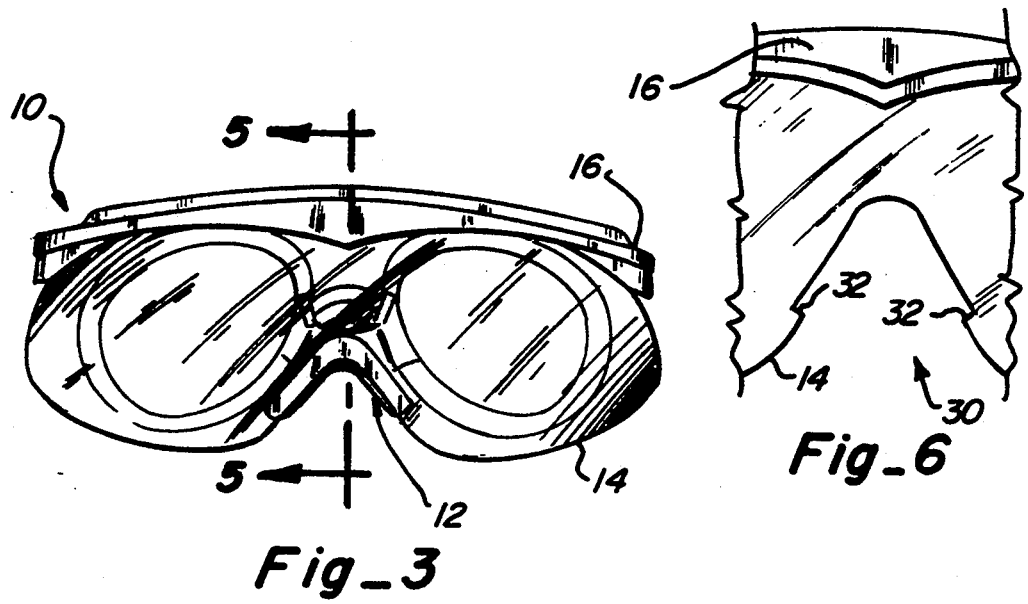
Fig_3
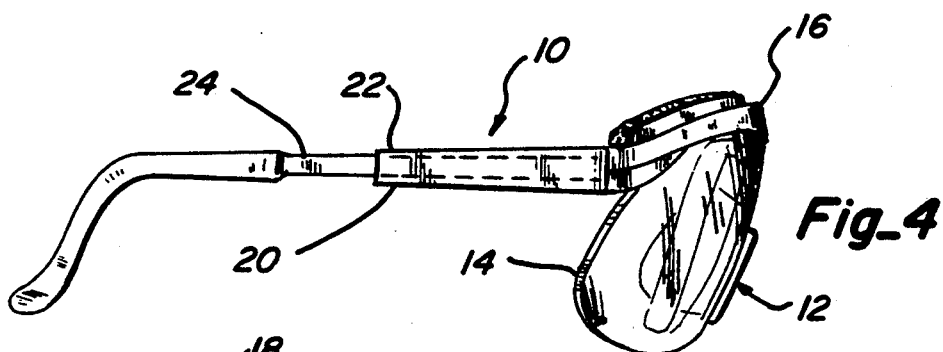
Fig_6
Fig_4
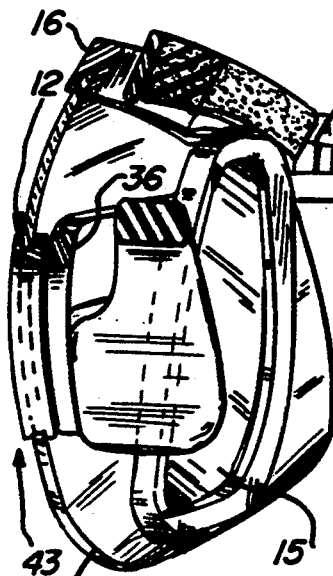
Fig_5
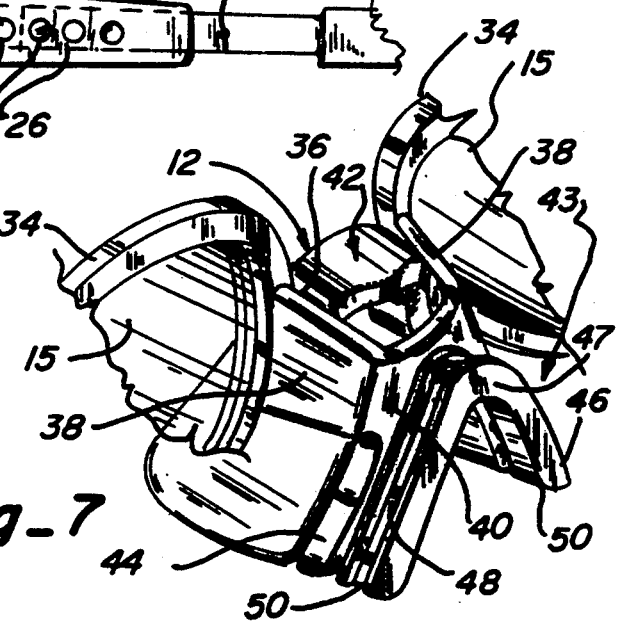
Fig_7

SUNGLASSES WITH DETACHABLE PRESCRIPTION EYEGLASSES

CROSS REFERENCE TO RELATED APPLICATION

The present application is a continuation of U.S. patent application Ser. No. 07/761,388, filed Sep. 18, 1991, and now abandoned.

BACKGROUND OF THE INVENTION

1. Field of the Invention

The present invention relates generally to sunglasses. More particularly, the invention relates to attachments or mountings for releasably attaching prescription lenses onto sunglasses.

2. Description of the Prior Art

The use of sunglasses has become more prevalent over the years. Sunglasses are recognized as useful for the protection of the eyes against ultraviolet rays. In fashion, new designs and colors have made them increasingly attractive as part of a person's overall wardrobe. In outdoor sports and outdoor activities, they have gained increasing acceptance. In certain sports, bicycling for example, specially designed sport sunglasses have gone from the exception to standard equipment.

Approximately 30% of all persons who might use sunglasses have the need for prescription lenses, either eyeglass lenses or contact lenses. Contact lenses may be used with sport sunglasses. However, many sport sunglasses now available have lenses made of a relatively thin, high strength polycarbonate plastic having an often complex curvature. Prescription lenses cannot readily be made to conform to such shapes and are unavailable commercially.

With conventional sunglasses, those other than sport sunglasses, a prescription can be made and corrective lenses mounted on the frame. Other known combinations of prescription lenses and sunglass lenses include use of a clip-on sunglass lens over a prescription eyeglass lens. The reverse has also been done, prescription lenses have been clipped over the frame of a pair of sunglasses to provide the necessary correction.

Many of the sport sunglasses referenced above are made so that the lenses and nose-pieces can be easily separated from the frames. No one has previously supplied an interchangeable nose-piece or insert for readily mounting prescription lenses onto sport sunglasses.

OBJECTS AND SUMMARY OF THE INVENTION

It is the principal object of the present invention to provide an interchangeable nose-piece supporting a pair of prescription lenses for mounting on a pair of sport sunglasses.

A pair of sport sunglasses has a frame which includes a bridge interconnected by pivots to a pair of side temples. The bridge releasably connects to a plastic lens or shield having a specific curvature. A recessed area in the lens receives a removable standard nose-piece or insert, which nose-piece rests on the nose of the user.

A standard interchangeable nose-piece of the invention includes a connector intermediate a pair of eyeglass mounting rims containing prescription lenses. Connected to and immediately forward of the connector is an adaptor which matingly fits into the recessed area in the sport sunglasses in place of the standard nose-piece.

When the user is wearing contact lenses, the standard nose-piece is used in conjunction with the sport sunglasses, and the sunglasses are worn in the known manner. When contacts are not being used, the user mounts a pair of prescription lenses into the mounting rims of the interchangeable nose-piece and inserts the interchangeable nose-piece into the plastic shield in place of the standard nose-piece. The combination of prescription lenses and sport sunglasses benefits users of sport sunglasses with poor eyesight corrected by eyeglasses.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a perspective view of a pair of sport sunglasses releasably connected to an interchangeable nose-piece fabricated in accordance with the present invention.

FIG. 2 is an exploded perspective view of the sunglasses and nose-piece of FIG. 1 showing both the interchangeable nose-piece and standard nose-piece.

FIG. 3 is a front view of the interchangeable nose-piece connected to the sport sunglasses of the present invention.

FIG. 4 is a side view of the interchangeable nose-piece connected to the sport sunglasses of the present invention.

FIG. 5 is a section taken along line 5—5 of FIG. 3.

FIG. 6 is an enlarged front elevational view of a recessed area of the sport sunglass shield.

FIG. 7 is a enlarged fragmentary perspective view of the interchangeable nose-piece connected to the sport sunglasses.

FIG. 8 is an enlarged perspective view of a nose-piece embodying the present invention.

DESCRIPTION OF THE PREFERRED EMBODIMENT

Referring to FIGS. 1 and 2, a pair of sport sunglasses 10, such as are available commercially from Bollé America under the trademark EDGE, which incorporate a protective lens or shield 14, are shown releasably connected by a nose-piece 12 to a prescription lens structure 17 which includes prescription lenses 15. The nose-piece 12 is interchangeable with and used in replacement of a known standard nose-piece 13 and serves to mount and support the prescription lens structure 17 behind the shield 14.

The sport sunglasses 10 include a thin plastic lens or shield 14, which has a specific curvature. The shield 14 is releasably attachable to a frame 11 which includes a frame bar or bridge 16 and a pair of side temples 20. The bridge 16 is pivotally connected by hinges 18 to the side temples 20. The temples 20 include a tubular hinged portion 22 and an adjustable extension portion 24, which is received by the hinged portion 22. The extension portion 24 wraps behind the ear of a user. Holes 26 are formed on an inner surface of the tubular hinged portion 22 to selectively receive nipples 28 of the extension portion 24 (FIG. 5). In this manner, the overall length of the temples 20 is adjustable.

The plastic shield 14 conventionally includes a recessed area or notch 30 in its bottom edge (FIG. 6) for receipt of either a standard nose-piece 13 or a nose-piece 12 forming a part of the present invention as shown in FIG. 2. The recessed area 30 includes inward notches defining locking shoulders 32 which hold ends of the nose-piece 12 or 13 and retain the nose-piece 12 or 13 in engagement with the shield 14 in a known manner. The nose-piece 12 or 13 is thus releasably connected to the shield 14.

In accordance with the present invention, the nose-piece 12 forming a part of the present invention (FIGS. 2, 7 and 8) supports a prescription lens assembly 17 formed by a pair of mounting rims 34 joined by a channel shaped connector or bracket 36. The rims 34 receive and retain prescription lenses 15 in a well-known manner. The connector or bracket 36 is generally U-shaped and includes a pair of outwardly and downwardly inclined legs 38, each secured at one end to a rim 34 and joined at their other ends by a web or rounded terminal end piece 40 thereby to integrally connect the rims 34.

For supporting the prescription lens assembly 17, as well as for supporting the sunglasses 10 on a wearer's nose, the nose-piece 12 is formed as an arch or inverted V-shaped member with depending outwardly sloping legs formed by an apex. More specifically, the nose-piece is formed by a first arched section 42 or adapter having a pair of outwardly sloping legs 43 joined at their upper ends by a rounded apex 44, and a second arched section 45 having a pair of outwardly sloping legs 46 joined at their upper ends by a rounded apex 47. The arched sections 42, 45 are integrally formed or may be separately formed and glued together. One face of the legs 43 and apex 44 of the first arched section 42 is channeled or slotted so that the sloping legs 43 and apex thereof form an upwardly extending hook as shown in FIG. 8, for supporting engagement with the prescription lens bracket 36. The interior surfaces of the legs 43 define integral nose pads 49 which rest on the bridge of a wearer's nose.

For securing the nose-piece 12 to the sunglasses lens, an exterior groove 48 is defined in the exterior surfaces of the legs 46 and apex 47 of the second arched section 45 for receiving the cut edges and shoulders 32 of the recessed area 30 of the shield when the nose-piece 12 is inserted into the recessed area 30, as shown in FIGS. 2, 3 and 5. The groove 48 terminates at ends 50. When the second V-shaped section 45 of the nose-piece 12 is inserted into the recessed area 30 of the sunglasses shield 14, the groove 48 receives an edge of the shield 14, just as is done with a standard nose-piece 13. The groove ends 50 are received and engaged by the shoulders 32 of the shield 14 for a releasable fit of the entire nose-piece 12 onto the shield 14 of the sport sunglasses 10.

The prescription lenses 15 are held in close proximity to the shield 14 by the interchangeable nose-piece 12. (FIGS. 4 and 5). The wearer of the sunglasses 10 receives the benefits of sports sunglasses and the ability to use prescription lenses at the same time.

Although the present invention is being described with a certain degree of particularity, it is understood that the present disclosure has been made by way of example, and changes in detail or structure may be made without departing from the spirit of the invention, as defined in the appended claims.

I claim:

1. Sport sunglasses comprising a bridge, a pair of temples hingably connected to said bridge at the ends thereof, a shield secured to and depending from said bridge and having a lower edge, a nose-piece notch defined in said lower edge, a nose-piece mounted on said shield in said notch, nose pads integrally formed on said nose-piece, an upwardly directed hook on said nose-piece adjacent said nose pads, a frame mounting a pair of prescription lenses, and a central U-shaped bracket on said frame releasably engaged with said hook and supporting said frame on said nose-piece with said prescription lenses in close juxtaposition to said shield and nose pads.

2. Sport sunglasses as defined in claim 1 wherein said temples are adjustable.

3. Sport sunglasses as defined in claim 1 wherein said shield defines shoulders projecting into said notch for engaging and retaining said nose-piece.

4. Sport sunglasses comprising a bridge, a pair of temples hingably connected to said bridge, a shield supported on and depending from said bridge, a nose-piece having a pair of upwardly sloping legs joined at their upper ends by an apex and defining with said apex an upwardly directed hook, nose pads integrally formed on said legs for supporting the nose-piece on a wearer's nose, means on said nose-piece defining a groove for receiving and retaining an edge of said shield, a prescription lens frame, and a U-shaped bracket on said lens frame having spaced downwardly and outwardly sloping panels joined by a central panel, said bracket engaging over said hook with said bracket panels supported on said nose-piece legs thereby supporting said prescription lens frame in close juxtaposition to said shield and nose pads.

5. Sport sunglasses as defined in claim 4 wherein said temples are adjustable.

6. A nose-piece for sport sunglasses, said sunglasses including a unitary shield defining a nose-piece receiving notch in its lower edge and prescription lenses supported in a frame closely adjacent said shield, said nose-piece comprising an inverted V-shaped block defining a pair of upwardly sloping legs joined at their upper ends to form an apex, a pair of spaced ribs on said legs defining a groove therebetween for receiving the edges of a notch on said shield, the inner surfaces of said legs defining pads adapted to rest on the nose of the user, means defining an upwardly opening channel in said legs and apex, said legs, apex and channel forming an upwardly directed hook, a U-shaped central frame bracket on said frame, said bracket having a pair of downwardly and outwardly sloping panels joined by a central panel, said central panel extending into said channel with said panels supported on said hook thereby supporting said prescription lenses on said nose-piece in close juxtaposition with said shield.

* * * * *